June 24, 1969 W. T. SIEGLE 3,452,338
MAGNETIC FILM MEMORY WITH DISPERSION LOCKING
Filed Sept. 13, 1965
FIG. 1
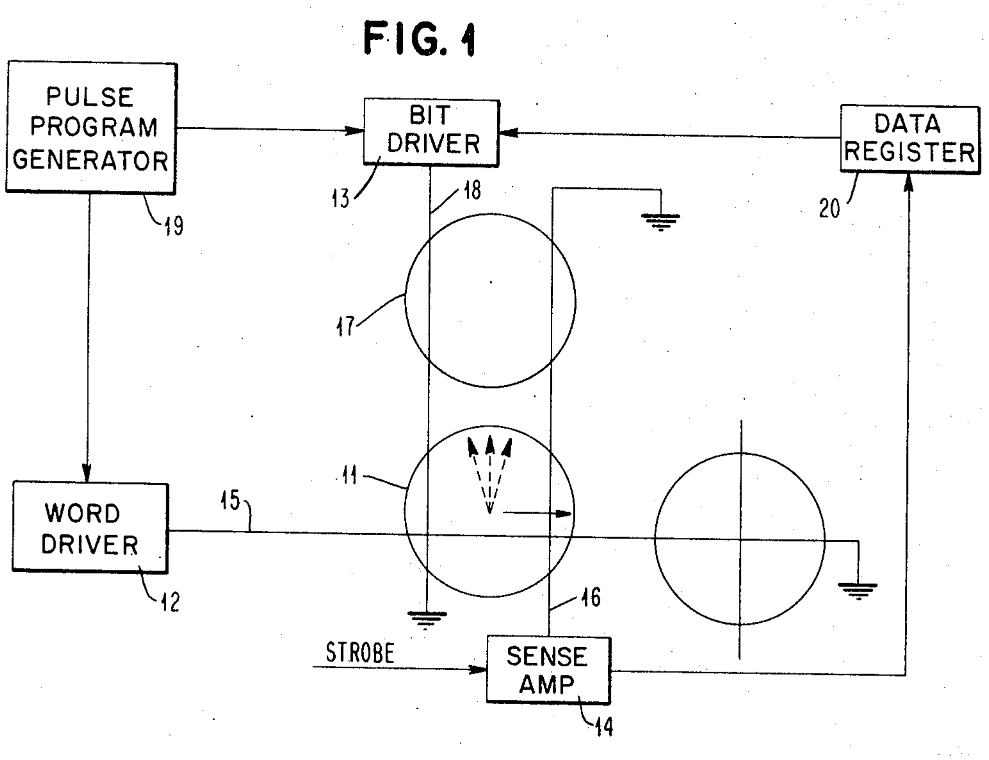
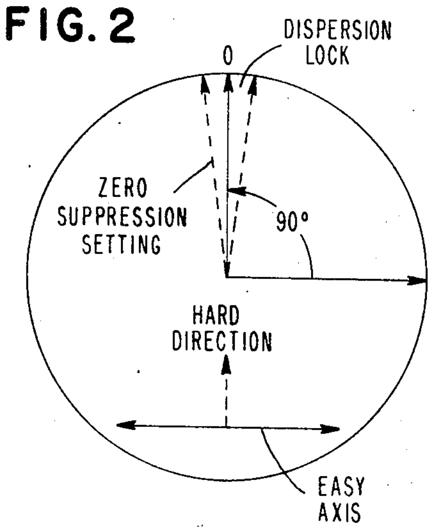
FIG. 3
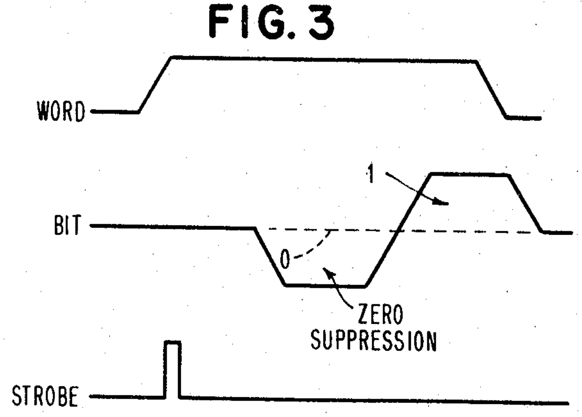
INVENTOR
WILLIAM T. SIEGLE
BY Carl C. Kling
ATTORNEY United States Patent Office 3,452,338
Patented June 24, 1969

3,452,338

MAGNETIC FILM MEMORY WITH DISPERSION LOCKING

William T. Siegle, South Burlington, Vt., assignor to International Business Machines Corporation, Armonk, N.Y., a corporation of New York Filed Sept. 13, 1965, Ser. No. 486,778
Int. Cl. G11b 5/06
U.S. Cl. 340—174 3 Claims

ABSTRACT OF THE DISCLOSURE

A magnetic thin film memory operating in the dispersion locked mode in which a storage element is set into a one storing state along its easy axis by coincident hard and easy axis magnetic fields and is set into its zero storing state along the hard axis by a hard axis magnetic field is improved by means providing an easy axis magnetic field that varies symmetrically in polarity; the first polarity portion of the easy axis magnetic field disturbs unaddressed zero storing elements away from the hard axis in one direction and thereby offsets the disturbance of these storage elements associated with the second polarity portion of the easy axis magnetic field which is required for writing ones into selected storage elements.

CHARACTERISTICS OF INVENTION

*Environment*

Dispersion locked mode magnetic film memory elements are operated between a first remanent state, along the easy axis, maintained by the uniaxial anisotropy of a single domain oriented film, and a second remanent state, along the hard axis at 90° to the easy axis, maintained by dispersion locking. The magnetic film stores a 1 by being magnetically oriented along the easy axis and stores a 0 by being magnetically oriented along the hard axis.

The film is read out by driving it toward the hard axis and monitoring for a flux change. The 1 state film produces a signal representing a flux change as the orientation of the film sweeps through an arc of 90°. The 0 state film produces negligible signal unless the film orientation is significantly displaced from 90° to the easy axis, in which case the orientation of the film sweeps through the displacement arc, providing a 0 output. The orientation of the 0 state film is a function of the dispersion of the film and the direction of the first magnetic field applied to the film after its setting to the 0 state. Any 0 state film which is subjected to the application of bit field, as a similarly positioned film in another word is driven to the 1 state, is disturbed, that is, is non-reversibly switched slightly toward the 1 state. Such disturbed 0 films, on readout, sweep through an arc necessary to return them from an orientation of less than 90° to the 90° state, which arc may be of sufficient size to generate 0 signals which can be mistaken for 1 signals. The state of an individual 0 state magnetic film in a memory is a function, not only of the data which is stored in it, but also of the effect on it of storing data in similarly positioned films of other data words. A 0 state film may be undisturbed or may be disturbed toward the 1 state. It is, however, necessary for the film which is storing a 0 to read out as a 0 state film, regardless of whether it is subjected to a 1 disturb or not.

*Objects*

An object of the invention is to eliminate the adverse effect of 1 disturb bit signals in a dispersion locked magnetic film memory by insuring that 0 state films are disturbed only in the direction opposite the 1 state. Another object of the invention is to provide a pulse program for operating a dispersion locked mode magnetic film memory to provide an increased signal to noise ratio.

Another object of the invention is to reduce 0 signals in a dispersion locked memory.

*Features*

A feature of the invention is a pulse program including a 0 signal suppression pulse preceding each bit pulse, so that the first disturb pulse applied to any 0 state film tends to orient the film in the direction opposite the 1 state orientation. Another feature of the invention is a pulse program including a symmetrical 1 bit signal, with the first half of the bit signal being oriented in a fashion to drive the magnetic orientation of the film toward an angle greater than 90° to the 1 state orientation and the second portion of the bit signal being arranged to overlap the termination of the word signal and oriented in a fashion to drive the magnetic orientation of the film to the 1 state orientation along the easy axis.

The advantage of the invention is the improved signal to noise ratio made available by the 0 signal suppression feature.

The foregoing and other objects, features and advantages of the invention will be apparent from the following more particular description of a preferred embodiment of the invention, as illustrated in the accompanying drawings.

*Figures*

FIGURE 1 is a simplified schematic diagram of a magnetic film memory operable according to the invention.

FIGURE 2 is a diagram of magnetic orientation for the easy axis 1 value and the dispersion locked hard axis 0 value.

FIGURE 3 is a pulse program according to the invention.

SUMMARY OF THE INVENTION

The invention is a magnetic film storage device operated in the dispersion locked mode with a 1 data state at 0° and a 0 data state at 90° to the easy axis, characterized by a pulse program including a 0 suppression pulse automatically preceding each bit pulse which insures an orientation for the 0 data state of more than 90°.

The 0 suppression pulse prevents magnetic films in the 0 state from being switched toward the 1 state as a result of the application of bit drive occurring during the process of writing a 1 into a similarly positioned film in another data word.

In operation, magnetic film 11 is operated between a 1 data state on its easy axis and a 0 data state at 90° to the easy axis. The film is uniaxially anisotropic, which makes the 1 data state a remanent state, but is of the high dispersion type which causes retention of magnetic orientation in the hard direction near 90° to the 1 state orientation. The zero suppression pulse insures that the 0 state film will be at more than 90°, on the easy axis. Pulse program generator 19 controls word driver 12 and bit driver 13 to operate film 11; sense amplifier 14 responds to electrical outputs as the film is read out.

The matrix configuration causes each magnetic film to be disturbed by the bit drive field used to switch a similarly situated film in another data word. The 0 state film is subject to a small rotation by the first application of magnetic field having an easy axis component, either in the bit direction or the antibit direction. The 0 suppression signal, preceding as it does the application of magnetic field in the bit direction, insures that the small rotation occur in the anti-bit direction; a 0 state film with drift in the anti-bit direction produces no output in the polarity of readout of a 1 state film.

DESCRIPTION OF INVENTION

The invention is a magnetic film storage device operated in the dispersion locked mode by a pulse program including a 0 signal suppression pulse preceding each bit pulse.

*Preferred embodiment*

FIGURES 1, 2 and 3 show a storage device including a multiplicity of magnetic film storage elements such as element 11, a multiplicity of word drivers such as word driver 12, a multiplicity of bit drivers such as bit driver 13 and a multiplicity of sense amplifiers such as sense amplifier 14.

In operation, magnetic film 11 is made up of a uniaxially anisotropic nickel iron film having a high dispersion. The film has an easy axis with two stable positions (0° and 180°) and can be set to the 0° easy axis direction by application of orthogonal magnetic fields. The horizontal arrow indicates the 1 state (0°) orientation. The film also has a remanent condition of dispersion locking at right angles to the easy axis. See FIGURE 2. This dispersion locked condition, defined as the 0 state, is not precisely at 90° but is somewhat inexact as shown by the broken lines. In operation, the magnetic film storage element making up a word are driven to the hard direction by the field generated by a pulse from the appropriate word driver, such as 12, along the word conductor, such as conductor 15. The magnetic field generated by the pulse from word driver 12 is oriented at right angles to conductor 15 and orients the magnetic film substantially in the hard axis direction. The magnetic field orientation thus is reset to the 0 state (dispersion locked state) by the application alone of the word drive pulse.

The word drive pulse thus serves as a read pulse. If the magnetic film 11 is already at the 0 state there is no change of magnetic flux, no signal is induced on sense conductor 16 and sense amplifier 14 provides no output. If, however, magnetic film 11 is moved from the 1 state to 0 state as a result of the word drive pulse, sweeping an arc of 90°, there is a significant change of magnetic flux, a signal is produced on sense conductor 16 and sense amplifier 14 provides an output. A strobe pulse applied to sense amplifier 14 at this time is helpful in defining the exact time of maximum output signal.

The matrix arrangement of film causes each film such as film 11 to be subjected at other times to a bit signal unaccompanied by a word signal, when a different magnetic film, such as magnetic film 17, is set to the 1 state. Magnetic film 11 is of the type which could be expected to drift toward the 1 state toward 0° as the bit field is applied to it as other films along bit conductor 18 are switched. This drift does not occur, however, because the zero suppression pulse is arranged to cause a previous drift to the opposite, or anti-bit, direction at a position of greater than 90°. See FIGURES 2 and 3.

The selected film switches as a result of the combination of a word field in the hard direction, which lowers the switching threshold of the film, and a bit field in the easy direction, which drives the film to the 1 state along the easy axis at the termination of the word pulse. The nature of the film is that it will fully switch only if a word field is present to lower the threshold, but otherwise will drift slightly. The 0 suppression field, occurring just before the 1 bit field, and in the opposite polarity, provides an opposite drift. This effectively prevents the change in orientation of a 0 state film as a result of the disturbing effect of one or a number of applied bit fields, since the film tends to drift only as a result of the first applied field.

Setting a film to the 0 state does not involve any bit pulse or 0 suppression pulse, but only the word pulse.

The storage device as a whole operates under control of pulse program generator 19 which controls timings of word drivers such as word driver 12 and bit drivers such as bit driver 13, according to the pulse program shown in FIGURE 3.

*Background information*

The following copending commonly assigned United States patent applications provide a background in magnetic film storage generally and in dispersion locked mode magnetic film storage.

U.S. patent application Ser. No. 798,722, now abandoned, filed Mar. 11, 1959, Hoffman et al., Magnetic Storage Devices.

U.S. patent application Ser. No. 334,858, filed Dec. 31, 1963, Bertelsen et al., Dispersion Locked Memory.

The pulse program generator may be made up of delay line elements arranged to provide the appropriate pulses. Such delay line pulse program generators are in use in several memory devices currently in use. Alternatively, a digital clock with suitable output powering can be used.

CONCLUDING SUMMARY

The invention is a dispersion locked mode magnetic film storage device operated according to a pulse program having each bit pulse preceded by an oppositely polarized 0 suppression pulse. This pulse program obviates any drift of film orientation by disturbing bit pulses which might otherwise cause undesirable 0 signals.

While the invention has been particularly shown and described with respect to a preferred embodiment thereof, it will be understood by those skilled in the art that various changes in form and details may be made therein without departing from the spirit and scope of the invention.

What is claimed is:

1. In a magnetic film memory made up of bit columns and word rows of uniaxially anisotropic magnetic film storage elements having high remanence dispersion characteristics for storing a binary 0 along a hard axis or storing a binary 1 along an easy axis of a storage element,
- a plurality of word conductors traversing said word rows of magnetic film bit storage elements,
- a plurality of word drivers connected to said word conductors,
- a plurality of bit conductors respectively traversing said bit columns of magnetic film bit storage elements,
- a plurality of bit drivers respectively connected to said bit conductors,
- sensing means respectively associated with said bit columns of bit storage elements,
- data register means connected to said sense amplifiers and to said bit drivers,
- characterized by;
- a pulse program generator coupled to said word drivers and to said bit drivers and arranged to control a pulse program including a word pulse which provides read excitation as well as lowering the threshold for writing in the elements of an addressed word row, and arranged to control production for selected bit conductors of a bit pulse in a polarity and amplitude for storing a 1 along the easy axis automatically preceded by a pulse of opposite polarity and of an amplitude to suppress the tendency for unaddressed 0 storing elements along a bit conductor to be displaced toward the 1 storing state by the bit current.

2. A magnetic film storage device comprising:
- (a) a plurality of individual bit storage elements made up of uniaxially anisotropic magnetic film material having an easy axis of magnetization and a high remanent dispersion characteristic which permits a stable state at right angles to the easy axis;
- (b) a plurality of word drivers and a respective plurality of word drive conductors connected to said word drivers and mounted across said films in a direction parallel to the easy axis of said magnetic film bit storage elements;

(c) bit drive means including a plurality of bit drivers and a respective plurality of bit drive conductors individually traversing said bit columns of said magnetic film bit storage elements;

(d) sensing means adapted to accept output signals generated by said bit storage elements for the respective bit positions;

(e) data input means connected to said bit drivers in a fashion to permit at least two different data related outputs from said bit drivers which data conditions may be designated first data state and second data state;

(f) pulse program generator means connected to said word drive means and to said bit drive means to provide a pulse program including a word excitation providing magnetic drive perpendicular to the easy axis of the individual bit storage elements of the selected word in such fashion that magnetic film bit storage elements in a first data state experience a magnetic reorientation and induce output signals detectable by said sense amplifiers, the excitation also serving to lower the threshold so that the individual magnetic film bit storage elements may be set to desired data states by the outputs of said bit drivers, a bit excitation parallel to said easy axis in a first direction and a suppression excitation parallel to said easy axis in a second direction in an amplitude to suppress the tendency of unaddressed storage elements in said stored data state along a current carrying bit drive conductor to be reoriented toward said first data state, said pulse program generator, bit drivers and data input means being so arranged that magnetic film bit storage element orientation in said second data state is achieved by the word excitation alone and magnetic film bit storage element orientation in said first data is achieved by a bit excitation parallel to the easy axis commencing during the terminal portion of the word excitation and terminating after termination of the word excitation, and also being arranged to provide said suppression excitation pulse commencing during the word excitation and terminating prior to the commencement of the bit excitation.

3. A magnetic film storage device comprising:

(a) a plurality of dispersion lockable magnetic elements;

(b) means for applying bit fields and word fields to said films selectively to cause writing and reading of data; and (c) means for controlling said means for applying bit fields to provide, for each application of bit field, a preceding oppositely polarized application of an amplitude to suppress the tendency of unaddressed elements to be displaced from the dispersion locked state by a bit field.

References Cited

UNITED STATES PATENTS

| | | | |
|---|---|---|---|
| 3,293,620 | 12/1966 | Renard | 340—174 |
| 3,320,597 | 5/1967 | Hart | 340—174 |

OTHER REFERENCES

Spain & Rubinstein, Thin-Film Switching in the Hard Direction by Wall Motion, March 1961, Journal of Applied Physics, vol. 32(s), pp. 288S and 289S.

BERNARD KONICK, *Primary Examiner.*

B. L. HALEY, *Assistant Examiner.*